(12) United States Patent
Liebermann et al.

(10) Patent No.: US 10,391,455 B2
(45) Date of Patent: Aug. 27, 2019

(54) FILTRATION AND EMULSIFICATION DEVICE

(71) Applicant: MST MICROSIEVE TECHNOLOGIES GMBH, Feldmeilen (CH)

(72) Inventors: Franz Liebermann, Feldmeilen (CH); Cornelis Johannes Maria Van Rijn, Hengelo (NL)

(73) Assignee: MST MICROSIEVE TECHNOLOGIES GMBH, Feldmeilen (CH)

( * ) Notice: Subject to any disclaimer, the term of this patent is extended or adjusted under 35 U.S.C. 154(b) by 657 days.

(21) Appl. No.: 14/779,809

(22) PCT Filed: Mar. 26, 2014

(86) PCT No.: PCT/EP2014/056080
§ 371 (c)(1),
(2) Date: Sep. 24, 2015

(87) PCT Pub. No.: WO2014/154761
PCT Pub. Date: Oct. 2, 2014

(65) Prior Publication Data
US 2016/0045871 A1 Feb. 18, 2016

(30) Foreign Application Priority Data
Mar. 26, 2013 (DE) .................. 20 2013 101 302 U

(51) Int. Cl.
*B01D 33/21* (2006.01)
*B01D 33/50* (2006.01)
(Continued)

(52) U.S. Cl.
CPC ............. *B01D 63/16* (2013.01); *B01D 33/21* (2013.01); *B01D 33/50* (2013.01); *B01D 33/503* (2013.01);
(Continued)

(58) Field of Classification Search
CPC ...... B01D 63/16; B01D 63/08; B01D 63/084; B01D 33/21; B01D 33/50; B01D 33/503;
(Continued)

(56) References Cited

U.S. PATENT DOCUMENTS 3,954,613 A     5/1976   Worlidge
3,994,813 A *   11/1976  Meier .................. B01D 29/416
                                                        210/330
(Continued)

FOREIGN PATENT DOCUMENTS

CN     202113680 U    1/2012
DE     2351298 A1     5/1974
(Continued)

OTHER PUBLICATIONS

English language Abstract for DE-102008008737A1.*
(Continued)

*Primary Examiner* — Benjamin L Lebron
(74) *Attorney, Agent, or Firm* — Steinfl + Bruno, LLP

(57) ABSTRACT

The invention relates to a device for the microfiltration, ultrafiltration, or nanofiltration and/or the emulsification of liquids. The device has at least one rotatable membrane medium, which has a filtrate/permeate side or a side facing a dispersed phase and a concentrate/retentate side or a side facing a coherent phase and which can be rotated in a container in order to produce a vacuum on an unfiltered liquid side or the side facing the coherent phase on partial regions of the at least one rotatable membrane medium in the container in small time segments at a frequency of 1-100 Hz.
(Continued)

Said container has at least one feed for an unfiltered liquid or the coherent phase, at least one overflow for an unfiltered liquid or an emulsion, and at least one rotatable channel for filtrate/permeate drainage or feed of the dispersed phase, and a suction device, in particular in the manner of a suction strip or nozzle plate. The suction device has at least one suction strip or nozzle plate arranged parallel to the rotatable membrane medium or is such a suction strip or nozzle plate, which is attached at a distance of less than 0.1 to 10 mm from the membrane medium, and thus cleans non-permeating materials collected on the unfiltered liquid side during a filtration process from a surface of the membrane medium, or promotes drop formation of the dispersed phase exiting from a membrane surface on the side facing the coherent phase during an emulsification process. The invention further relates to uses of the device.

6 Claims, 11 Drawing Sheets

(51) Int. Cl.
| | | |
|---|---|---|
| *B01D 63/16* | (2006.01) | |
| *B01D 65/02* | (2006.01) | |
| *B01D 65/08* | (2006.01) | |
| *B01D 33/23* | (2006.01) | |
| *B01F 3/08* | (2006.01) | |

(52) U.S. Cl.
CPC .............. *B01D 65/02* (2013.01); *B01D 65/08* (2013.01); *B01D 33/23* (2013.01); *B01D 2313/10* (2013.01); *B01D 2313/54* (2013.01); *B01D 2315/02* (2013.01); *B01D 2315/16* (2013.01); *B01D 2321/26* (2013.01); *B01F 3/0807* (2013.01)

(58) Field of Classification Search
CPC ........ B01D 33/39; B01D 33/37; B01D 33/68; B01D 65/02; B01D 65/00; B01D 65/08; B01D 2313/10; B01D 2313/54; B01D 2315/02; B01D 2315/16; B01D 2321/26; B01D 2321/2008; B01D 46/0065; B01D 46/10; B01D 46/125; B01D 46/46; B01D 46/26; B01D 2273/28; B01D 33/23; D01H 11/005; B01F 3/0807
See application file for complete search history.

(56) References Cited

U.S. PATENT DOCUMENTS

| | | | | |
|---|---|---|---|---|
| 4,200,525 A * | 4/1980 | Karr | ................... | B01D 11/0434 |
| | | | | 210/634 |
| 4,222,754 A * | 9/1980 | Horvat | ................... | B01D 46/26 |
| | | | | 55/283 |
| 4,904,282 A * | 2/1990 | Stuble | ................ | B01D 46/0065 |
| | | | | 55/294 |
| 5,114,444 A * | 5/1992 | Stuble | .................. | B01D 46/002 |
| | | | | 15/312.1 |
| 6,103,132 A * | 8/2000 | Seyfried | ............. | B01D 33/073 |
| | | | | 210/791 |
| 6,217,637 B1 | 4/2001 | Toney et al. | | |
| 6,558,545 B1 | 5/2003 | Bläse et al. | | |
| 2004/0028875 A1* | 2/2004 | Van Rijn | ................ | A61L 27/50 |
| | | | | 428/98 |
| 2008/0248182 A1* | 10/2008 | Jongsma | ............. | B01D 65/102 |
| | | | | 426/580 |

FOREIGN PATENT DOCUMENTS

| | | | |
|---|---|---|---|
| DE | 102006038340 A1 | 2/2008 | |
| DE | 102008008737 A1 * | 8/2009 | ........... B01D 63/081 |
| EP | 2042229 A1 | 4/2009 | |
| EP | 2394733 A1 | 12/2011 | |
| JP | 2002166110 A | 6/2002 | |
| WO | 97/19745 A1 | 6/1997 | |
| WO | 2010072230 A1 | 7/2010 | |
| WO | 2010136602 A1 | 12/2010 | |
| WO | WO-2010136602 A1 * | 12/2010 | ............. B01D 29/74 |

OTHER PUBLICATIONS

International Search Report for International Application No. PCT/EP2014/056080 filed Mar. 26, 2014 on behalf of MST Microsieve Technologies GMBH, dated Jun. 10, 2014. 7 pages. (German + English Translation).

Written Opinion for International Application No. PCT/EP2014/056080 filed Mar. 26, 2014 on behalf of MST Microsieve Technologies GMBH, dated Jun. 10, 2014. 16 pages. (German + English Translation).

* cited by examiner

FILTRATION AND EMULSIFICATION DEVICE

CROSS REFERENCE TO RELATED APPLICATIONS

The present application is the US national stage of International Patent Application PCT/EP2014/056080 filed internationally on Mar. 26, 2014, which claims priority to German Patent Application No. 202013101302.1 filed on Mar. 26, 2013.

The invention relates to a device having at least one membrane medium in a receptacle, which can be used in the same design for both filtration as well as emulsification.

Typically, the filtration of liquids is the separation of unwanted particles from an unfiltered substance, e.g. from liquids, gases or suspensions, known as unfiltered substance, in order to produce two phases: a filtered, purified substance known as filtrate (in the case of microfiltration) or a permeate (in the case of ultrafiltration and nanofiltration), and a concentrated phase, the concentrate (in the case of microfiltration) or the retentate (in the case of ultrafiltration and nanofiltration). During said filtration process, particles present in the unfiltered liquid, also known as feed liquid, tend to accumulate on one or a plurality of regions of the filter medium surface, e.g. the membrane or microsieve surface in the concentrate or retentate phase, i.e. on the side of the filter medium or microsieve facing the unfiltered liquid. A cake or covering layer gradually forms on the membrane or microsieve surface. The accumulation of particles or macromolecules in the unfiltered liquid, also known as supply liquid, creates a back-up, a concentration gradient known as concentration polarization, in the immediate vicinity of and on the membrane or microsieve surfaces, which causes an interference with the filtering capacity.

Microsieves are defined as very flat filtration membranes having high porosities (>20%) and/or having pores with a pore channel length less than ten times or less than three times the pore diameter.

A variety of methods have been disclosed, which either prevent an accumulation of particles on the filter medium or remove accumulated particles or layers from the filter medium.

Aside from cross-flow filtration, the common filter cleaning practice includes backwashing of the filter medium. With backwashing, a cleaning fluid, e.g. deionized (DI) water or the filtrate proper, also known as permeate, is transported from the filtrate side, also known as permeate side, through the filter medium to the concentrate side, which is also known as retentate side. For this purpose, a higher transmembrane pressure (TMP) than the one required for the filtration is briefly applied to the filtrate (permeate). To this end, the termination of the filtration process is often necessary. In this case, the backwashing takes place after the filtration process. Another known option is backwashing using short backwashing blasts, that is, a reversal of the direction of flow through the membrane, by applying a negative TMP during the filtration process, i.e. without ending it. Said types of backwashing methods are characterized by a relatively complicated design and only achieve a limited cleaning effect on membrane or microsieve surfaces. The effectiveness of said backwashing methods is limited by (1) relatively low backwashing frequencies (1-60 times per hour) and (2) large distances between the place where the backwashing strokes (blasts) originate and the membrane surfaces, especially in industrial plants. The latter can result in either unwanted hammer strokes or delays. During the backwashing strokes, the filtration is not only stopped, but it is also reversed, as a result of which already generated filtrate is lost.

A known method of cross-flow filtration is the rotation of filter discs during the filtration, in order to reduce the formation of a covering layer on the membrane or microsieve surface with the application of shearing forces. Examples of said types of filter systems are characterized by the stacking of filter discs having center bores, which are mounted on individual or on a plurality of sleeve shafts. The stack of filter discs is rotated around its axis.

However, the formation of a covering layer on the membrane or microsieve surface cannot be adequately reduced with said measures either. One of the consequences is that the filtration capacity decreases quickly relatively soon after the start of the filtration process, depending on the substance to be filtered and the equipment used. Even high rotational speeds are often unable to remove particles from the pores of the filter medium, as illustrated in FIG. 1. In that case, blocked pores can only be unblocked by reversing the direction of flow.

It is therefore desirable to find a reliable and simple method for cleaning the membrane or microsieve surfaces, thereby preventing the formation of a covering layer on the filter medium during the filtration process.

A variety of solutions have been described; for example, a textile processing device is disclosed in U.S. Pat. No. 6,217,637 B1, designed to separate small particles from an air flow. This is achieved with a two-stage filter system, in which meshed fabric is clamped onto rotating filter drums or filter discs. In order to prevent clogging of the meshed fabric with mesh sizes that typically are within a range between 20 and 80 mesh (hole size of 1.2-0.3 mm), a cleaning method using dry vacuum is introduced, which is characterized in that a vacuum arm (p. 12, FIG. 3) generates negative relative pressure intended to remove a possible covering layer from the meshed fabric. Similarly, movable or stationary devices for the backwashing of filter drums by way of nozzles or suction devices are also disclosed in the German patent no. DE 23 51 298 A and in U.S. Pat. No. 4,222,754.

In contrast, the invention described herein is preferably intended for the membrane filtration of liquids using microfiltration, ultrafiltration and nanofiltration membranes having an average pore size between 5 micrometers and 0.5 nanometers and which are used for example for protein fractionation, beer clarification or sterile filtration of products for the food industry, dairy industry, pharmaceutical and biotechnology production. Unlike with the devices described above, it is not a drum but a disc or a package of rotating discs that is cleaned simultaneously with the invention described herein. Unlike with the methods mentioned above, the present invention is not about traditional backwashing, but about high-frequency flow reversal, also known as "rapid flow reversal".

The object of the present invention is to achieve the filtration efficiency of filter devices having in particular rotating filter media or microsieves in an economically feasible, technologically innovative and scalable fashion.

In so doing, the high-frequency flow reversal ("rapid flow reversal") is used. As mentioned earlier, the membrane filtration capacity is limited by fouling ("formation of layers on the membrane by suspended or dissolved colloidal substances of organic origin, having a reducing effect on the filtrate throughput capacity, among other things because of microbial contamination . . . " Gasper et al., Handbuch der industriellen Fest/Flüssig-Filtration, 2. Auflage, Weinheim, 2000 [Gasper et al., Handbook of industrial solid/liquid filtration, 2$^{nd}$ edition, Weinheim, 2000]) in the membrane pores, which causes the filtration capacity to decrease considerably over a certain period of time. A high-frequency flow reversal prevents said decrease in the filtration capacity. With the high-frequency flow reversal, the transmembrane pressure is reversed for a short period of time, thereby also briefly reversing the direction of flow. Said reversal of the flow direction does not only clean the membrane surface, but also impurities present in the membrane pores.

The relevant difference between the high-frequency flow reversal according to the invention and the traditional backwashing as well as the previously known high-frequency backpulsing is that the two previously known methods always generate a pressure from the side of the membrane facing the filtrate through the membrane into the side of the unfiltered liquid, even though all substances that limit or prevent the filtration capacity are present on the membrane surface facing the unfiltered liquid or in the pores. Thus, the individual pore is freed from a covering layer for a short period, which can then immediately regrow. Comparable with a thin horizontally mounted plastic film (analogous to a biofilm or a covering layer), in which an opening (pore) is made from below using an air tube with the application of an overpressure impulse (analogous to a backflow impulse), said opening closes after the application of the pressure impulse, and the film (biofilm or covering layer) comes to rest on the opening in the tube (pore), sealing it again if pressure is applied from the top of the film. In contrast, the high-frequency flow reversal according to the invention starts on the membrane surface facing the unfiltered liquid, that is, directly at the location where said layers are formed. As a result, said non-permeating substances, which are causally responsible for membrane fouling and blocking, can be removed directly from the place they are created and most notably completely across the entire membrane surface and thus in a significantly more efficient fashion. Finally, in contrast to backflushing and backpulsing, the substances forming the covering layers are removed from the membrane surface through suction slots and transported away with high-frequency flow reversal, rather than merely being pushed out of the pores.

The object of the present invention is the high-frequency flow reversal by means of a suction strip or a nozzle plate that achieves a brief reversal of the flow direction during the filtration process. In order to ensure a reversal of the flow direction through the membrane medium, also known as membrane or filter medium if it relates to filtration, the suction strip or nozzle plate generates a negative relative pressure that is at least equal to the transmembrane pressure applied during the filtration.

Typically, the high-frequency flow reversal occurs at frequencies between 1 and 100 Hz. High-frequency flow reversal is required anywhere where high-performance filters with particularly efficient membrane layers are used, which are characterized in that they are operated at lower TMPs (typically <0.5 bar), and whose performance (measured in generated filtrate or permeate volume per filter surface, unit of time and transmembrane pressure) decreases by orders of magnitude within several minutes (far in excess of 90%) in spite of overflow speeds of up to 20 m/s ("cross flow"), but without the use of high-frequency flow reversal. For instance, when filtering drinking water using a high-performance membrane, the capacity decreases from 36 m$^3$/m$^2$/h/0.2 bar to below 300 L/m$^2$/h/0.2 bar (0.3 m$^3$/m$^2$/h/0.2 bar) within 9 minutes, in spite of an overflow with a circumferential velocity of 12 m/s. Said membrane fouling cannot be reversed with normal backwashing or backpulsing and has therefore been deemed irreversible in the past.

For the first time, the invention achieves a reduction of the filtrate loss to a minimum, because the volume of liquid required for cleaning the membrane surface by high-frequency flow reversal decreases to the third power with a decreasing distance between the suction slot and the membrane surface. This possibility does not exist with any of the currently known backwashing or backpulsing systems.

The device according to the invention is suitable both for microfiltration, ultrafiltration or nanofiltration (i.e. for pore sizes between 0.5 nm and 5 μm) as well as for the emulsification of liquids. It has at least one rotatable membrane medium with a filtrate/permeate side (in the case of filtration processes) or a side facing a dispersed phase (in the case of emulsification processes) and a concentrate/retentate side (in the case of filtration) or a side facing a coherent phase (in the case of emulsification). The membrane medium can be rotated in a receptacle. The receptacle comprises at least one feed for an unfiltered liquid or the coherent phase, at least one overflow for an unfiltered liquid or an emulsion and at least one rotatable channel for filtrate/permeate drainage or feed of the dispersed phase and a suction device. A vacuum can be generated in the receptacle on subareas of the at least one rotatable membrane medium by means of the suction device. The vacuum can be generated in small time segments, wherein the vacuum can preferably be applied in intervals. It is intended to apply a vacuum with a frequency of 1-100 Hz. It is applied on a side of the unfiltered liquid or the side facing the coherent phase. The suction device comprises at least one suction strip or nozzle plate arranged parallel to the rotatable membrane medium or is such a suction strip or nozzle plate. It is attached at a distance of less than 0.1-10 mm from the membrane medium. The distance is preferably less than 1 mm. This way, a surface of the membrane medium can be cleaned from non-permeable substances accumulated on the unfiltered liquid side during a filtration process or drops formed of the dispersed phase exiting from a membrane surface can be transported on the side facing the coherent phase during an emulsification process.

Surprisingly, it has been determined that the filtration capacity is optimized with the continuous cleaning of the filter medium or microsieve during the filtration of impurities that may accumulate on the filter surface or membrane. Said purification takes place during the filtration process through one or a plurality of nozzles or suction strips, which locally apply a negative transmembrane pressure (TMP) on the membrane surfaces. Said process can also be referred to as aspiration of filtrate/permeate through the membrane or microsieve surfaces into the feed side of the filter housing.

During the filtration process, layers are formed by a new type of backwashing or a new type of backpulsing, herein referred to as high-frequency flow reversal, at higher frequencies with very small volumes of filtrate/permeate and very close to the membrane or microsieve surface, that is, the location where the covering layer is formed, whereby the filtration capacity can be boosted effectively.

Individual exemplary embodiments of the invention are explained and described below with reference to the Figures.

According to the invention, negative TMP is applied for short periods during the filtration process in the following fashion in a preferred embodiment of a filter device, comprising at least one filter medium 3, e.g. a microsieve, a filter housing and a device for rotating the filter medium 3 in the filter housing, see FIG. 2. A nozzle plate or suction strip 11 is attached on the concentrate or retentate side 1 at a distance 9 of less than 1 mm to 5 mm from the rotating filter medium 3. Reference number 7 designates the holder of the suction strip or nozzle plate 7. The nozzle plate or suction strip 11 is operated with a negative relative pressure or suction with regard to the TMP, thus aspirating the concentrate or retentate fluid above the membrane or microsieve surface. As the nozzle or suction strip 11 is in close proximity of the filter medium 3 or microsieve, particles and components of the covering layer are also sucked into the nozzle or suction strip 11 together with the absorbed fluid 6, thus achieving a locally efficient cleaning 10 of the filter medium 3, whereby the original filtration capacity is almost restored.

The nozzle or suction strip 11 is preferably attached such that the aspiration takes place across the entire effective area of the filter medium 3 during one full rotation of the filter medium 3, in order to aspirate all of the accumulated particles and covering layers via the nozzles or suction strip 11. The negative pressure applied locally on the filter medium 3 by the nozzles or suction strips 11, should be greater than the TMP.

According to the invention, a high flow resistance is generated between the unfiltered liquid side and the suction strip 11. A sufficient vacuum or suction pressure can be maintained in this fashion.

According to the invention, additional measures can be adopted in order to generate a maximum speed or a maximum suction pressure of the fluid between the filter medium and the suction strip 11. A maximum buoyancy force is generated on the covering layer and particles in the filter medium in this fashion.

The suction strip 11 close to the filter medium will preferably be wing-shaped (see FIG. 3; cp. reference number 12), in order to create a more laminar flow and/or turbulence and to generate a better suction or suction pressure.

The suction strip or nozzle plate 11 comprise at least one nozzle or slot, also known as suction slot 8, which is therefore installed in the suction strip or nozzle plate 11, parallel to the filter medium 3. The nozzle or slot 8 should be placed as closely to said filter medium 3 as possible. Typically, said distance 9 is less than 1 mm, and in particular, the distance ranges between 0.05 and 0.25 mm. An excellent suction performance was achieved in tests with a distance of less than e.g. 0.25 mm. The required amount of liquid 6 that flows through the slot 8 is low.

The suction strip or nozzle plate 11 has a total width of several mm to several cm parallel to the filter medium 3. The vacuum between the suction strip 11 and the filter medium 3 is transferred better in this fashion. The wider the suction strip 11 is, the greater is the corresponding suction pressure. The total width of the suction strip or nozzle plate preferably amounts to approximately 1-10 times the distance of the suction strip or nozzle plate from the membrane medium—in this case, the filter medium. It is obvious that the total width of the suction strip or nozzle plate is dependent on the total width of the filter medium to be cleaned. For filter media with large diameters, it may be necessary to provide a plurality of suction strips or nozzle plates arranged side by side for each filter medium. A suction strip or nozzle plate that is at least five times wider than its distance to the membrane has proven to be especially efficient.

In order to protect the filter medium or microsieve from coming directly into contact with the suction strip during the rotation, the filter medium is embedded in a filter carrier with a depth between 10 and 500 μm, preferably with a depth between 50 and 200 μm in a preferred embodiment.

The suction strips 11 or the slot-shaped nozzles 8 are preferably arranged radially in relation to a filter medium 3, e.g. a round filter or microsieve disc, and perpendicular to the rotational axis. The width of the slot 8 should not be too small in order to prevent an unwanted pressure decrease in the suction strip itself; on the other hand, the width of the slot 8 should not be too large either, because this reduces the flow resistance between the suction strip and the filter medium. Typically, the slot 8 will have a width between 50 μm and 10 mm, and preferably between 200 μm and 1 mm.

In that case, the parallel suction strip or nozzle plate 11 has a width of several millimeters to several centimeters and is therefore always wider than the width of the slot 8. In a preferred embodiment, the total width of the suction strip/nozzle plate 11 is at least 10 times the width of the suction slot 8. In the embodiments shown in FIGS. 2 and 3, the width of the suction slot 8 is defined by the holder 7. Reference number 11 refers to the actual suction strip. It is used to aspirate the covering layer, which is subsequently removed through the holder 7 in the presented embodiment. The suction strip 11 is wider than the suction slot 8. It generates high shearing forces; correspondingly, its distance to the filter medium 3 should be set as small as possible.

According to the invention, a reverse flow is achieved through the nozzles or suction strips during the filtration process, generated by the application of a relative vacuum that is sufficient for removing particles pushed onto the filter medium 3 or microsieve by the TMP. A targeted local vacuum of 10 to 500 millibar is typically generated in this fashion. In so doing, there is no need to stop the filtration process as it is necessary with some traditional backwashing procedures. The closer the suction strip is attached relative to the filter medium 3, in particular the membrane, the exponentially greater the suction pressure will be. The suction is aimed at a very narrowly defined membrane segment, which minimizes the filtrate loss (permeate loss) on the one hand and achieves an undamped flow reversal impulse of the highest degree of effectiveness at this location. The high degree of effectiveness is due to the fact that normal backwashing systems are arranged at a greater distance to the membrane, which results in losses caused by elasticities or scattering.

What is relevant for this invention is that the vacuum is locally applied onto the unfiltered liquid or the concentrate or retentate side 1 through slots 8 (nozzles) in the suction strip or nozzle plate. Said pressure change from relative overpressure, the TMP to relative vacuum on the surface of the filter medium 3, is preferably brief and occurs for example several times within a second. Said pressure change phases, consisting of TMP—vacuum—TMP, can take place very rapidly, briefly and in frequent intervals.

For the person skilled at the art, it is clear that the filtration capacities are possibly dependent on the type of unfiltered liquid, the filtration device, the rotational speed, the selected filter medium 3, etc.

Analogously, the person skilled at the art will be able to understand the invention as a relative specification and take the necessary measures to adapt the invention to their needs and conditions. For instance, experiments conducted by the applicant have shown improvements in the filtration capacity of 1.5-60 times compared to filtration in the same system, albeit without the aspiration according to the invention.

Favorable results were achieved if the filter medium 3 was set to an average rotational speed between 1 and 100 Hz, and the local vacuum was applied periodically and during less than 1% of the total rotating time. During the remaining rotation time (>99%), the local filter medium cleaned in this fashion contributes to the operating performance of the filtration method. One example is a slot width 8 of 1 mm with a circumference of the rotating filter medium of 10 cm.

The easy scalability of the device according to the invention is a special advantage of the present invention. An overview of the design of a larger system is shown in FIG. 6, comprising only two pluggable basic elements having a center bore, which are stacked onto a rotatable sleeve shaft 19 and sealed with a cover 50 by way of tie rods 51. The two basic elements are the internal rotating membrane support element (FIG. 7) not visible on the overview drawing (FIG. 6) and the stationary impulse suction element (impulse-pull-element) shown in FIG. 6, which at the same time has a membrane-protective function. The complete device in FIG. 6 is labeled with reference no. 18. The impulse suction element is labeled with reference no. 37 and described in more detail in FIG. 9. The two basic elements, that is, the membrane-protective element 60 (see FIG. 7) and the impulse suction element 37 (see FIG. 9), are alternatingly stacked onto a rotatable sleeve shaft 19 (see FIG. 10) and fastened with tie rods (51), in particular four tie rods.

The membrane support element 60 (see FIG. 7) is rotatable. It rotates while in operation. It supports the membrane medium, e.g. the filter membrane or a membrane through which emulsification takes place. The membrane medium is not shown in the illustration of FIGS. 7 and 8. The membrane support element 60 is characterized by a center bore 20 and filigree membrane support diaphragms 21 having diaphragm strengths between 0.1 mm and 1 mm, which divert the flow of filtrate/permeate into the sleeve shaft 19 (see FIG. 10) through openings 22 in the cylindrical diaphragm of the center bore 20. The membrane support diaphragms 21 are arranged at a distance 23 (see FIG. 8) between 0.1 cm and 10 cm. Following the shape of an involute to a circle 24, as illustrated in FIG. 8, they extend from the center bore 20 at an angle $\beta$ 25 between 1° and 89° to a tangent touching the perimeter of the center bore, toward the outer edge of the membrane support element 60. The design of the membrane support element 60 is symmetrical with respect to the axis of the center bore 20 as illustrated in FIG. 7; thus, the same membrane support diaphragms 21, also known as profiled elements, are present both on the front 27 as well as the back 28 of the membrane support element 60. In each case, a membrane disc ring can be attached on both sides by means of an outer 29 and an inner sealing ring 30. The membrane medium supported by the membrane support element 60 is called membrane disc ring. The membrane medium comprises a center bore. The membrane disc ring is not shown in the Figures.

The unit comprising the membrane support element 60 and the membrane medium or membrane disc ring is also known as membrane disc.

The membrane medium, e.g. a membrane, is fastened on the membrane support element 60 with a flat ring each (on the inside and on the outside) between the inner outer edge, indicated with the outer sealing ring 29, and the outer inner edge, indicated with the inner sealing 30, of the membrane support element 60, which are arranged level to the membrane support diaphragms 21, and sealed with an O-ring each (on the inside and on the outside).

Alternatively, the membrane support element 60 can be made of glass and connected and sealed with a microsieve membrane by anodic bonding, whereby no other seals are required.

In the illustrated embodiment, the individual rotating membrane support elements 60 comprise collars 31, which are symmetrical to the rotational axis and are plugged together at their outer end and sealed with an O-ring 32 against the filtrate channel that runs through the center bore 20. In an alternative embodiment, a sleeve shaft 19 can be omitted all together by attaching suitable connecting pins between the individual elements.

The impulse suction element 37 (FIG. 9) is stationary, i.e. it is not rotatable. It comprises a slightly larger center bore 33 than the membrane support element 60 (cp. FIGS. 7 and 8) and overlaps the circumference of the rotating membrane support element 60, in order to provide the diameter required for the feed, overflow and aspiration of the unfiltered liquid, which is dependent on the operating mode and type of liquid to be filtered. In addition, it serves as protective hood for the membrane medium such as a membrane, and comprises a plurality of bores 34 at the outer edge, typically 2-50 bores, for the feed of the unfiltered liquid. Additional bores 35, which are connected with the suction slots 36 via cross-bores 35a, help with the withdrawal of covering layers that are forming on the membrane surface via the suction slots 36. The suction effect is created by one or a plurality of pumps (not illustrated) arranged on the outflow side of the bores 35. Said suction slots 36 are used for the high-frequency flow reversal, and the number of bores 35 and 35a is dependent on the number of suction slots. The suction slots 36, typically two, four, six or eight, are arranged radially at a 90°-angle to the center bore 33 and are parallel to the membrane surfaces at a distance of 1 mm to 0.01 mm. Like the membrane support element 60, the impulse suction element 37 has an identical design with respect to the center axis; thus, the bores 34, 35, suction slots 36 and suction strips 38 are present both on the front 39 as well as the back 40 of the impulse suction element 37. A plurality of impulse suction elements 37 can be plugged together via the outer edge. The outer edge of one impulse suction element 37 comprises a channel 41, which can retain an O-ring and be plugged into the adjacent impulse suction element, etc.

The sleeve shaft in FIG. 10 is characterized by bores 42 in the tube wall for draining the filtrate and a tappet 43 for transferring the rotation to the membrane discs. Membrane support elements with an integrated membrane medium, e.g. the membrane ring described above, are defined as membrane discs. The recess 26 in the membrane support element 60 is the counterpart of the tappet 43. The sleeve shaft 19 is rotatable or is rotated during operation. The tappets 43 engage with the recesses 26 of each membrane support element, making them rotate as well. The tappets 43 are dragging the membrane support elements 60 so to speak.

Finally, the invention can be operated in reverse direction according to the invention, in order to produce emulsions using the same design as the one described above for filtration. The object of the present invention is to achieve the emulsification efficiency of devices in particular having rotating membranes or microsieves in an economically feasible, technically innovative and scalable fashion.

One exemplary embodiment of an emulsification device is described below, with reference to FIGS. 11 and 12.

According to the invention, the dispersed phase is filled into the membrane support elements 144 (cp. also FIGS. 7 and 8) via the sleeve shaft 147 (cp. also FIG. 10). The rotation of the sleeve shaft 147 and the membrane support elements 144 generates a centrifugal force, which continuously pushes the dispersed phase through the pores of the membrane medium, herein illustrated in the form of membrane discs 146, preferably microsieve discs (with pore diameters decreasing radially in the direction of the membrane's outer edge, in order to equalize the increasing pressures generated radially in the direction of the membrane's outer edge with the rotation of the membrane) into the depressurized coherent (continuous) phase. Narrow suction slots 136, having a width between 0.2 mm and 10 mm, in particular 0.5 and 2 mm, are installed in the suction strips 138. With the rotation (arrow in FIG. 11) of the membrane discs 146, the dispersed phase forms drops with growing drop necks on and directly above the membrane surface (according to v. Rijn, Nano and Micro Engineered Membrane Technology, Elsevier, 2004, p. 347 et sqq.) when exiting through the membrane's pores. The longer said drop necks become, the larger the drops of the dispersed phase in the emulsion become, while the drop size distribution at the same time becomes broader and less controllable. Said drops of the dispersed phase are pushed directly onto the membrane surface by the rotation-related shearing force they are exposed to after exiting the membrane pores. As a result of the application of a pull generated through the stationary suction slots 136 on the membrane surface, which is focused on a small segment of the rotating membrane surface, drops of the dispersed phase forming on the membrane surface are raised from the membrane surface shortly after exiting from the membrane pores and before longer necks can be formed, where they are exposed to considerably greater shearing forces, separated from the necks and pulled into the suction slots. Said separation preferably takes place in short time segments of 1-100 Hz. The emulsion generated in this fashion is removed via the suction pipes 135 by means of a pump.

The drop size and the breadth of the drop distribution of the dispersed phase in the emulsion is dependent on the pore diameter of the membrane, rotational speed, number of suction strips and the applied suction (capacity of the suction pump). The feed channel 148 is used for the continuous feeding of the emulsification device according to the invention with the coherent phase. The coherent phase is guided into the receptacle 145 through the feed channel 148, at pressures that are lower than the exit pressure of the dispersed phase generated at the membrane surfaces by the centrifugal force. The membrane discs 146 are sealed against the membrane support element with O-rings 129.

Preferred exemplary embodiments of the invention are explained below:

Example 1: filtration of low-fat milk: a microsieve (filter medium) with a pore size of 0.9 microns and a membrane strength of approx. 1 micron and an open surface of >20% is installed in a revolving disc, the filter carrier, at a distance of about 5 cm from the rotational axis. The filter receptacle was filled with low-fat milk at 18-23° C. and a constant TMP of 0.1 bar was set, while the disc with the filter medium is rotated at a constant speed of 20 cycles per second. The initial filtration capacity or filtration flow (flux) was close to 8,000 L/m$^2$/h, but decreased to less than 500 L/m$^2$/h within several seconds. Such a reduction of the filtration capacity is typical in the state of the art with a filtration apparatus in which said type of filter medium is used. When the suction strip or nozzle plate according to the invention was used in such a way that the filter medium was periodically cleaned locally, the flux was restored to more than 5,000 L/m$^2$/h.

However, if the high-frequency flow reversal with suction strip or nozzle plate according to the invention is used from the start, the stable generation of permeate quantities of 18-30 m$^3$/m$^2$/h at pressures of up to a max. of 0.15 bar and with rotational speeds of 10-20 cycles per second was possible over 4-6 hours. This method allows the reduction of the bacterial load in low-fat milk, measured in CFU (colony-forming units) by 4-6 log stages. Here, the slot has a width of 0.5 mm and a distance of approximately 500 µm as contrasted to the filter medium. The circumferential velocity is close to 2π×5 cm and the effective filtration time is almost 99.7%.

Example 2: unskimmed milk: the device according to the invention described above and a microsieve used as filter medium with a pore diameter of 0.9 microns was used to filter unskimmed milk with a fat content of 3.6% at 50° C. With rotational speeds of 20-30 cycles per second and the same number of backpulsing intervals, the stable filtration of 9-12 m$^3$/m$^2$/h was possible with pressures close to 0.2 bar over a period of 4 hours.

Example 3: filtration of beer: here, a microsieve (filter medium) having a pore size of 0.6 microns is installed in a revolving disc at a distance of about 5 cm from the rotational axis. The filter receptacle was filled with unfiltered beer at 5° C. and a constant TMP of 0.1 bar was set. The rotation of the disc with the filter medium was set to a constant speed of 10 cycles per second. The initial filtration capacity (flux) is close to 12,000 L/m$^2$/h, but decreases to less than 1,000 L/m$^2$/h within ten seconds. If the aspiration through a suction strip or nozzle strip was added, such that the filter medium was periodically locally cleaned, it was possible to restore the average flux to a value of 8,000 L/m$^2$/h. Here, the slot has a width of 0.8 mm and a distance of approximately 500 µm as contrasted to the filter medium. The circumferential velocity is close to 2π×5 cm and the effective filtration time is almost 99.5%.

Example 4: emulsification: it is known that ceramic membranes have been studied extensively for emulsification applications with a non-rotating membrane device. Typical dispersed phase streams of an oil during the preparation of an oil-in-water emulsion by means of a ceramic membrane having an average pore size of 0.8 micrometers are 30-100 L/m$^2$/h at an operating pressure of 3-10 bar. In that case, the average emulsion droplet size is typically a few micrometers, with a broad drop size distribution.

With a device according to the invention, in which rotating microsieve membranes having slot-shaped pores with a pore size of 0.8 microns were used, it was possible to generate flows of a sunflower oil for the preparation of an oil-in-water emulsion of 3,000-5,000 L/m$^2$/h with an operating pressure of only 0.3 bar at 40 rotations per second in the coherent aqueous phase. Surprisingly, emulsion droplets with an average size of close to 1.6 micrometers were found, with a standard deviation of the size distribution of 0.2 micrometers.

FIG. 4 shows the flux if the nozzle or suction strip are operated and a local reverse flow according to the invention, as a function of the suction pressure (or energy), which is generated above the microsieve surface in order to remove particles and coatings. In this fashion, it was possible to measure an average beer filtration capacity of nearly 6,000 L/m$^2$/h (with a TMP of 0.1 bar and at 5° C.), which was maintained for more than 16 hours.

FIG. 5 shows a rotating filtration device 81, with a plurality of microsieves 82 lined up in parallel rotating in it, equipped with an integrated nozzle or suction strip 83, having an inlet, overflow and filtrate outlet 84, 85 to collect the filtrate stream 86. It can be seen that the suction device comprises various suction extensions extending between the microsieves. The concentrate liquid, which is rich in covering layer, is removed directly from the microsieves 87 at periodic intervals, during every rotation.

The rapid-onset and high efficiency of the high-frequency flow reversal is illustrated below with reference to FIG. 13, wherein the setting of the pull was first reduced by 40%, then by 60% and subsequently raised back to 100%, depending on the pumping capacity with two different test fluids (low-fat milk with different fat contents, referred to as "test 1" and "test 2"). It is clearly visible how quickly and strongly—by much more than 90%—the flux decreases, especially when the pumping capacity is reduced to 40% (see reference no. 201) and how it recovers with the restoration of the original pumping capacity (100%) and thus the pull acting on the membrane surface (cp. reference no. 202), when the covering layers are effectively removed again. The diagram illustrates how quickly the filtration capacity collapses and how efficiently the flow reversal works. If the suction capacity is reduced by 60%, the flux decreases by more than 95%. As soon as the suction capacity is increased again, the covering layer is again removed immediately; the original filtration capacity (measured by the flux) is restored.

Similarly, the invention can be used in a normal (non-rotating, also known as stationary) filter system, where a plate can be provided with a number of slots, which can be arranged movable with respect to the filter medium.

Above, the invention has already been described with reference to the Figures. It should be noted that the exemplary embodiments illustrated in the Figures are for illustration purposes only and do not represent any restrictions of the claimed invention. In the Figures:

FIG. 1 shows a schematic representation of a cross-section through a microsieve during filtration. A standard situation is shown, such as it already occurs after a short filtration time. A filter cake, a covering layer, has accumulated above the filter medium, blocking the pores.

Figure 1:
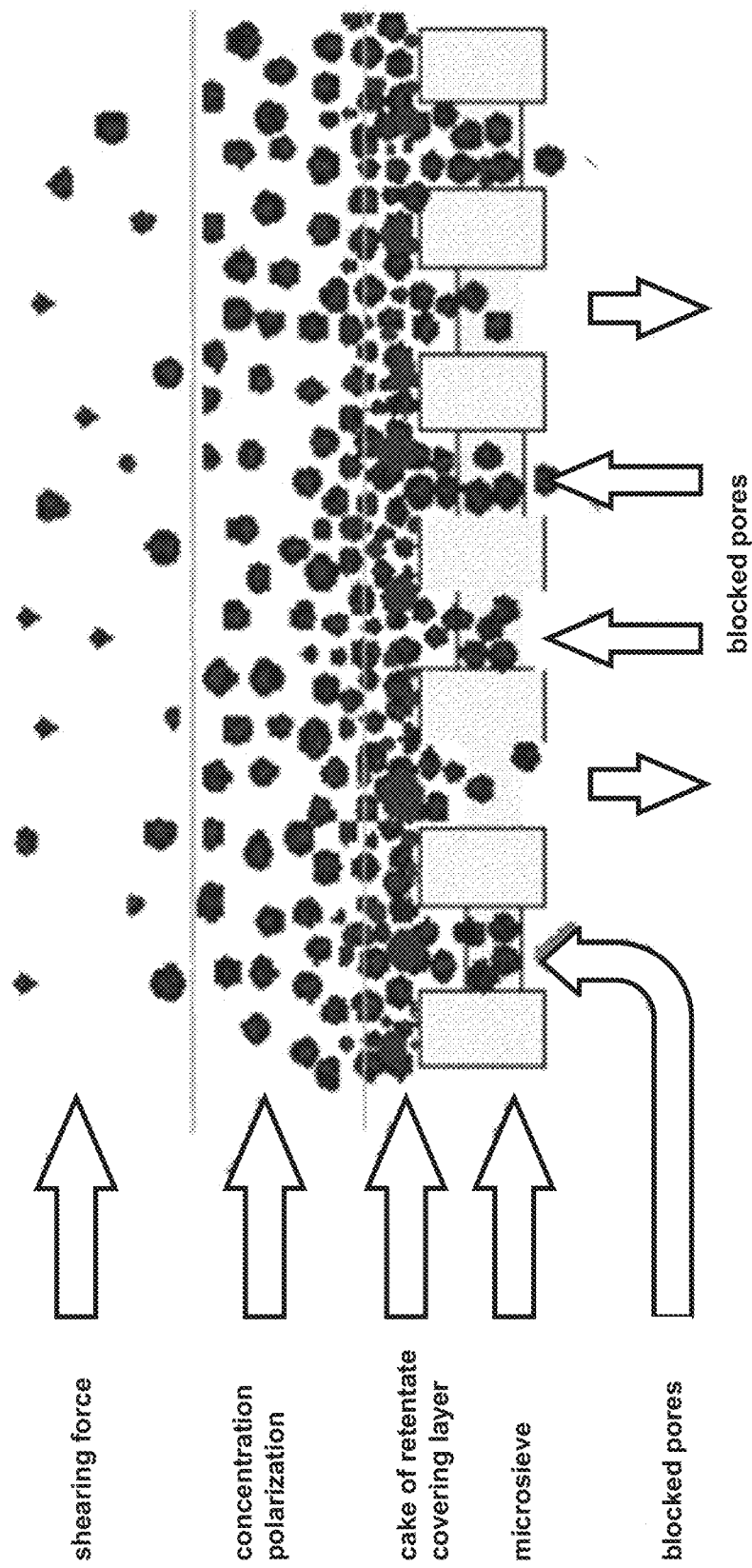
Figure 2:
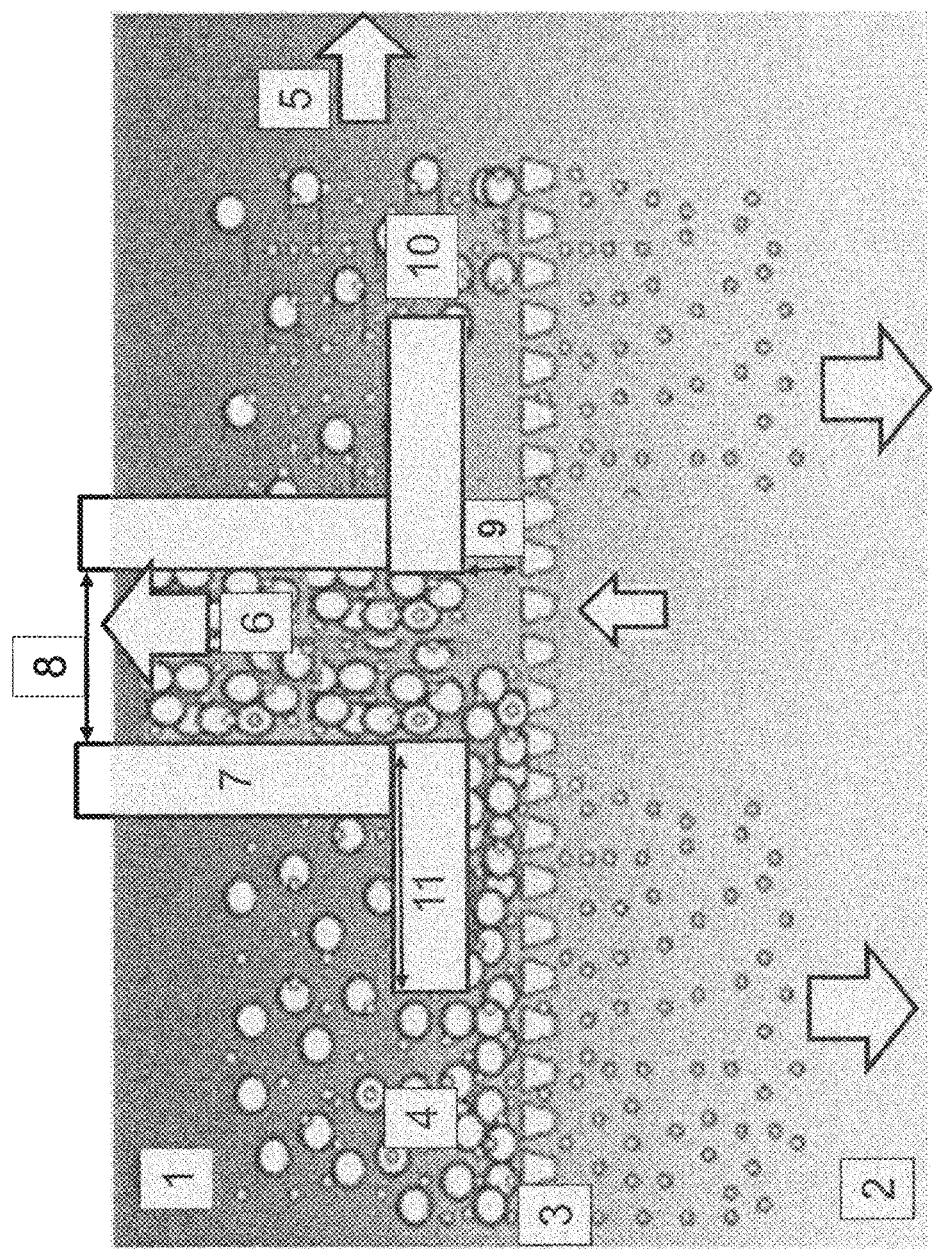
FIG. 2 shows a schematic sectional view of the invention. Compared to FIG. 1, it shows how the filter medium surface is cleaned and the blocked pores become unblocked again.
Figure 3:
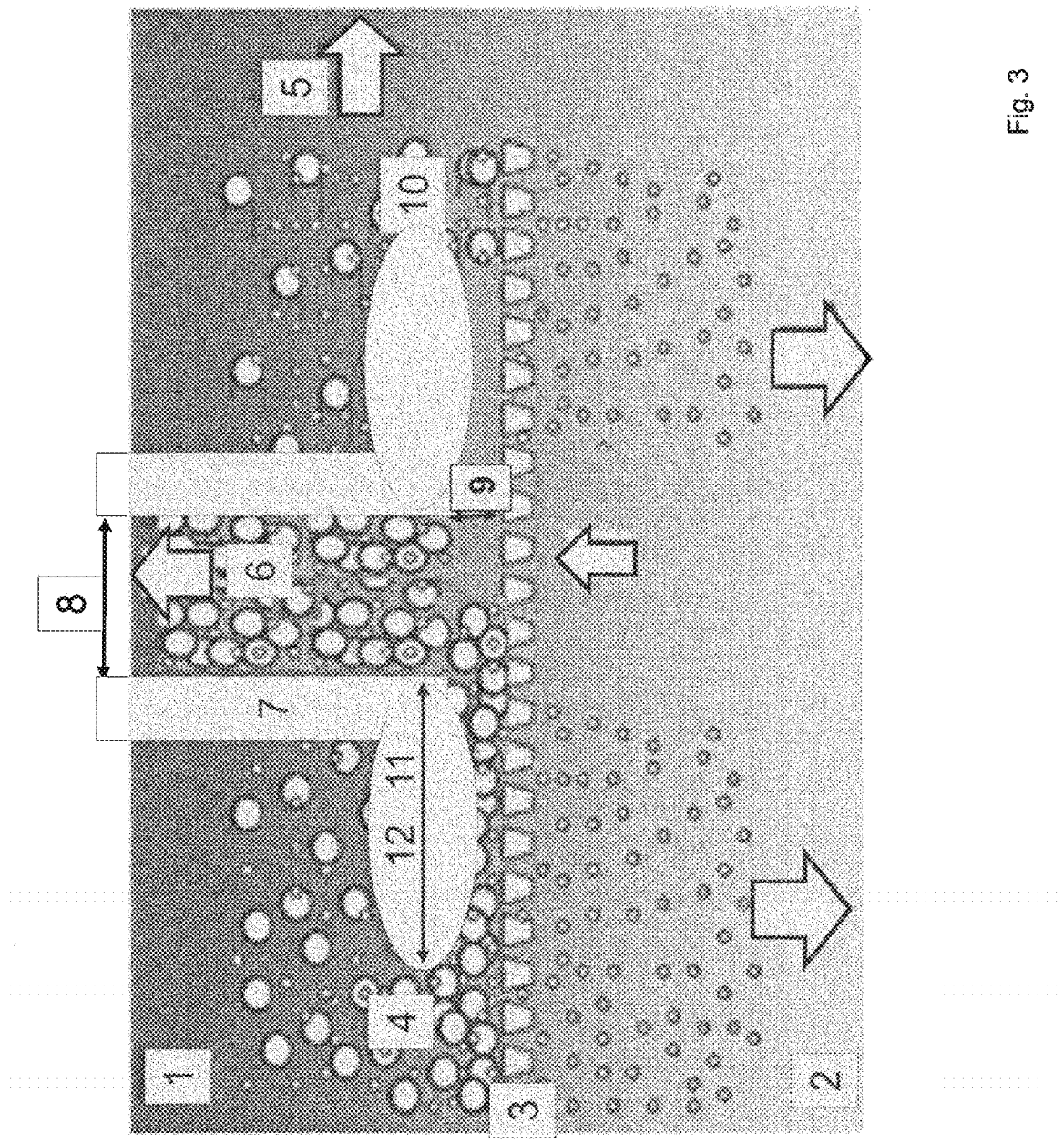
FIG. 3 shows an alternative embodiment of the invention.
Figure 4:
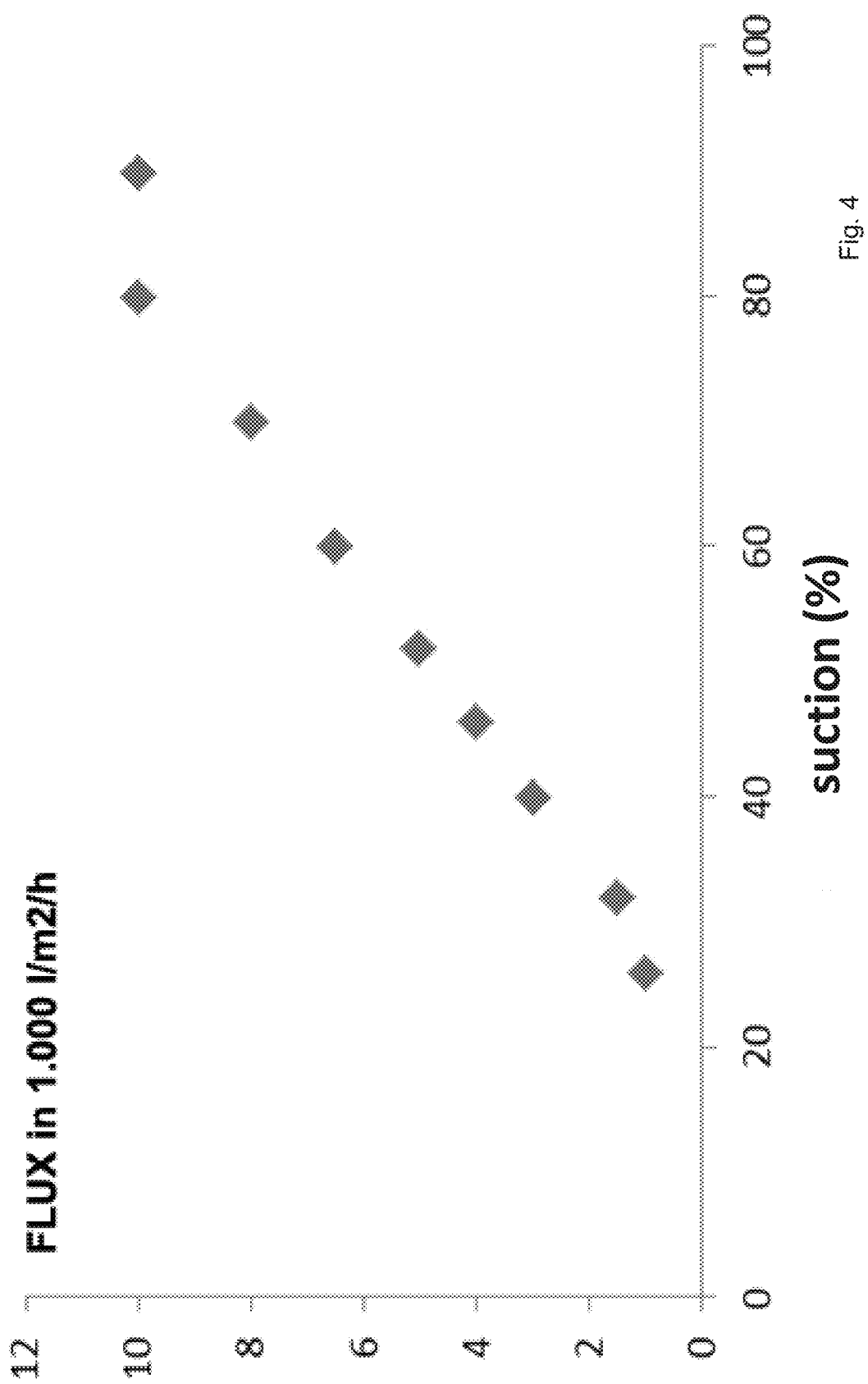
FIG. 4 shows a flux in a filter device according to the invention.
Figure 5:
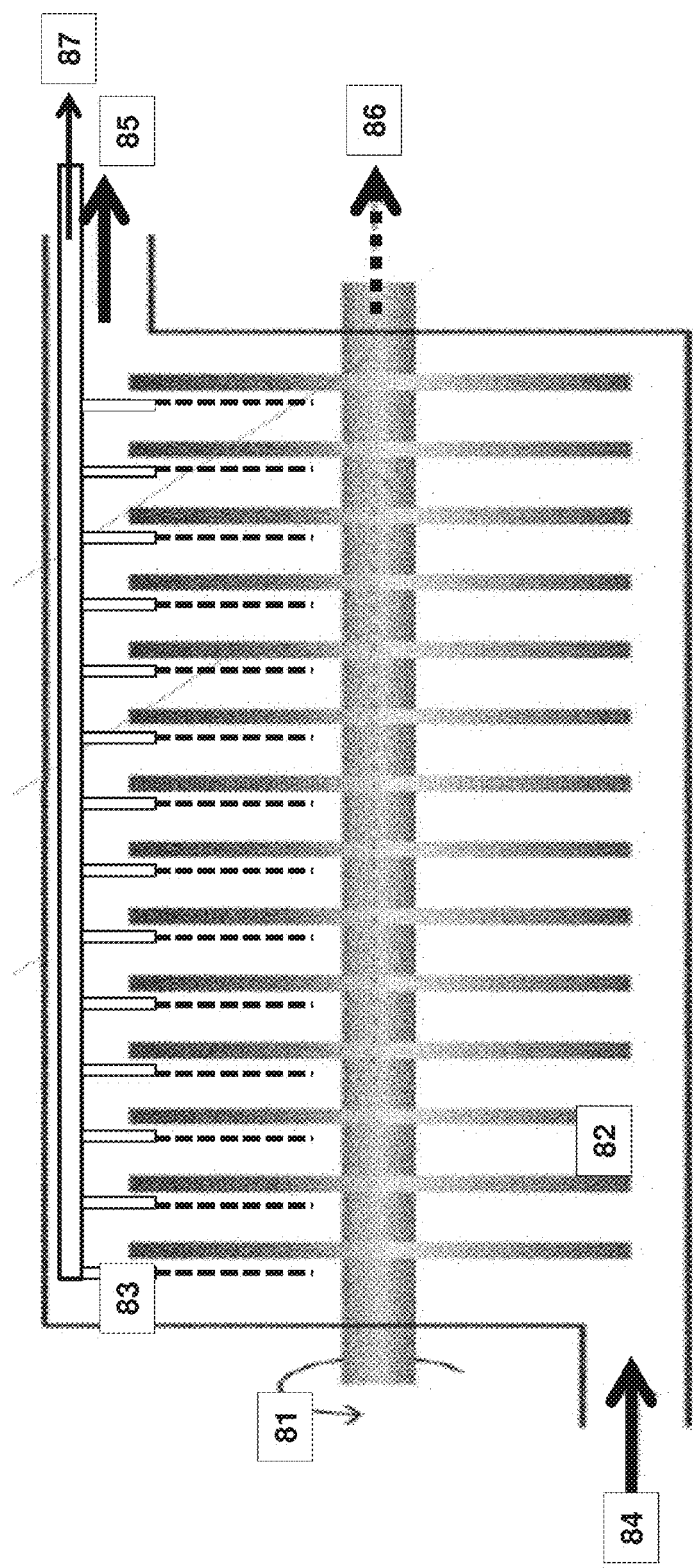
FIG. 5 shows a further exemplary embodiment in the form of a rotating, horizontally arranged stack of filter media and an analogously designed suction device.
Figure 6:
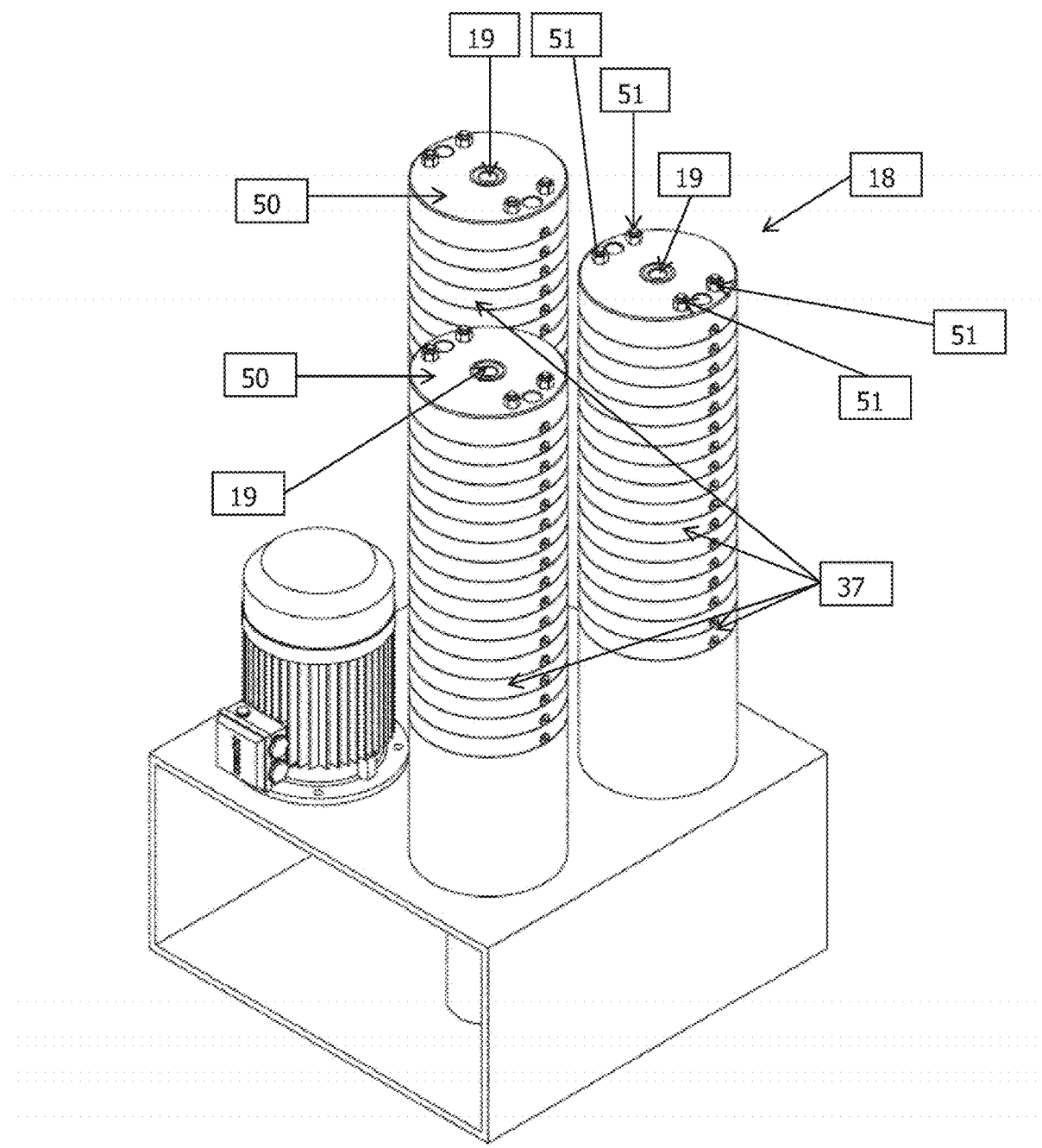
FIG. 6 shows a perspective representation of an exemplary embodiment for the scaling of the invention, comprising two multipliable and pluggable basic elements.
Figure 7:
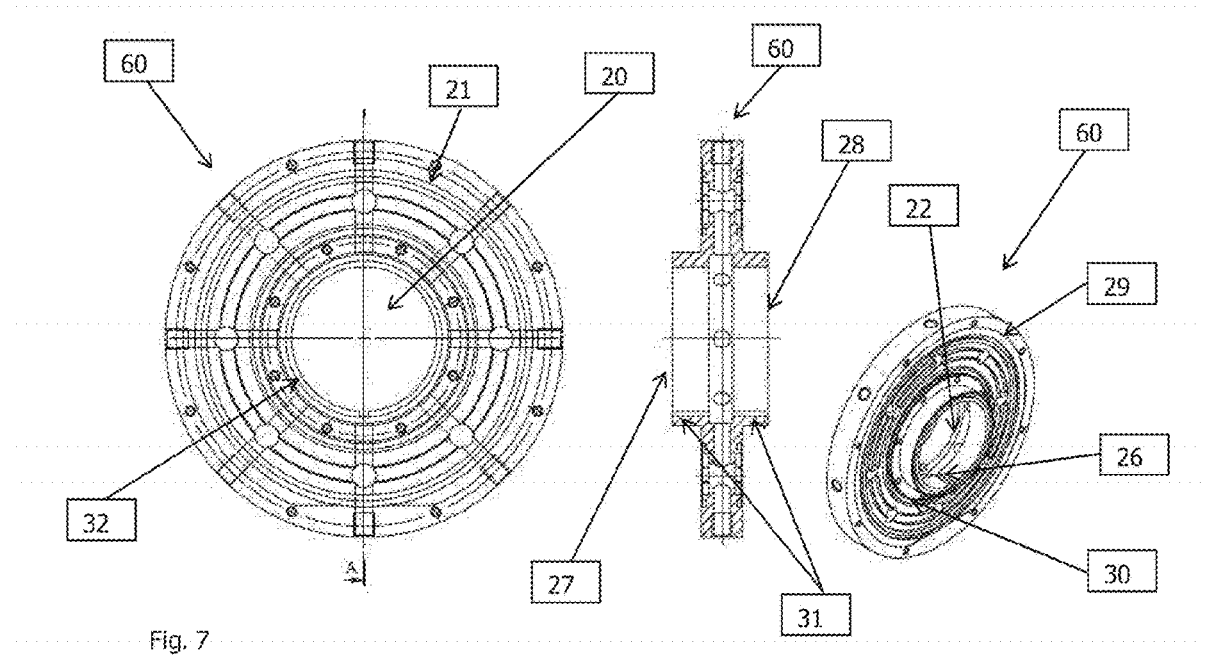
FIG. 7 shows a top view (left), a section (middle) and a perspective representation (right) of the rotatable membrane support element.
Figure 8:
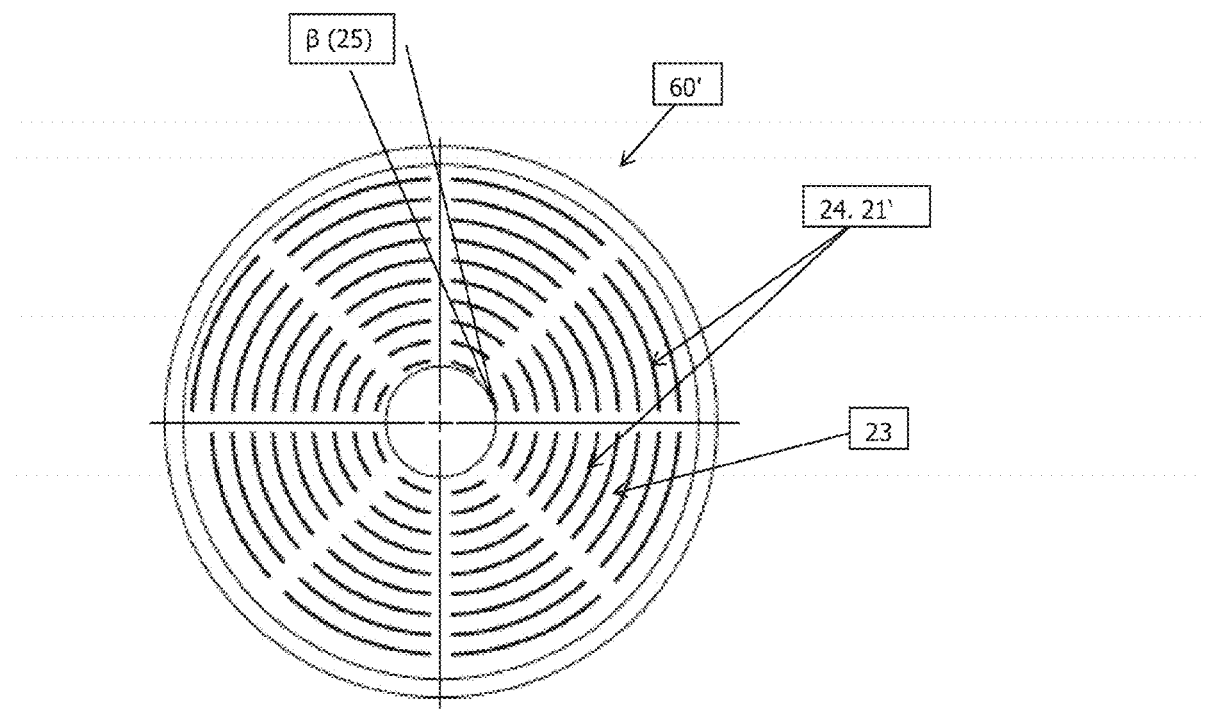
FIG. 8 shows the membrane support element having filigree support diaphragms arranged in the shape of an involute to a circle.
Figure 9:
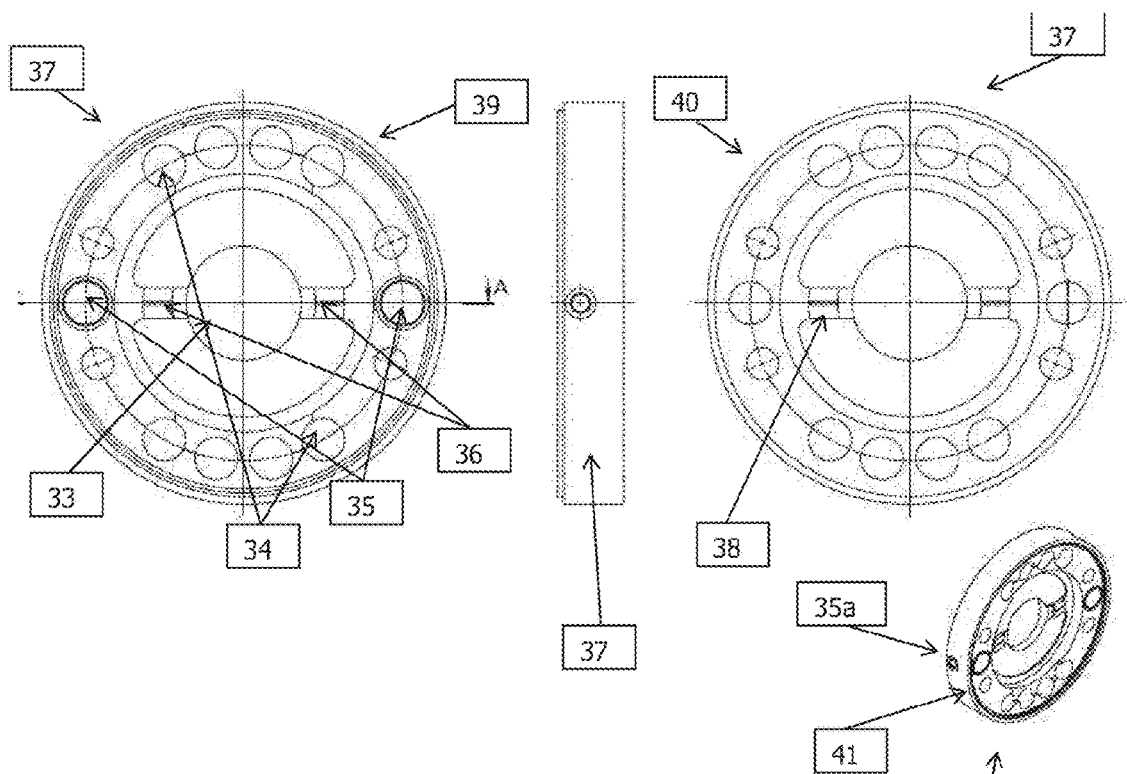
FIG. 9 shows a top view (left), a side view (middle) and a bottom view (top right) as well as a perspective representation (bottom right) of the stationary backpulsing and membrane-protective element.
Figure 10:
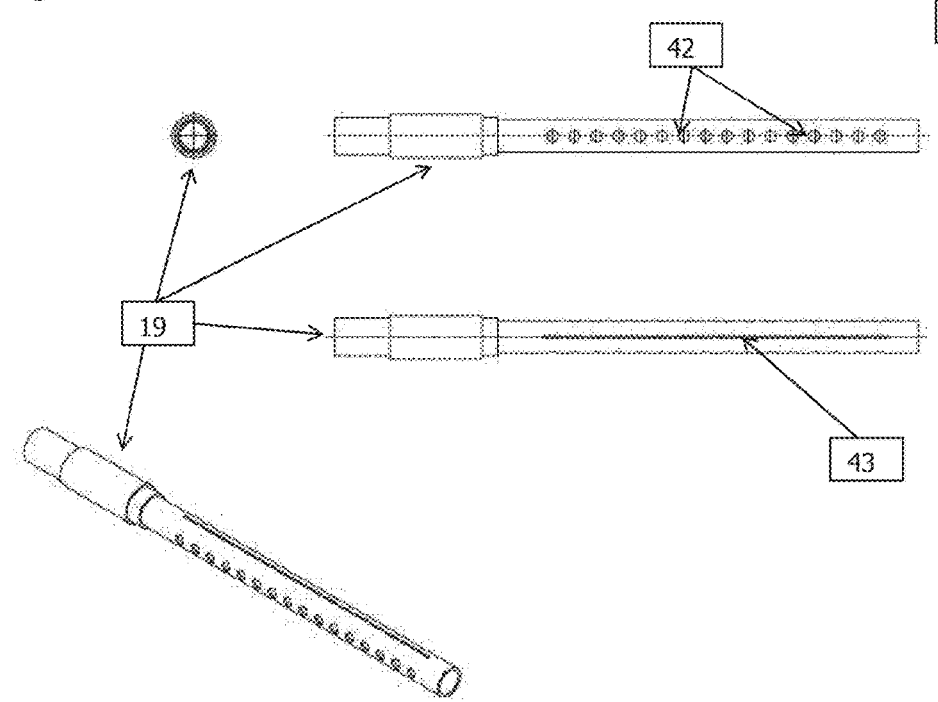
FIG. 10 shows a top view of a rotatable sleeve shaft as filtrate/permeate drainage channel.
Figure 11:
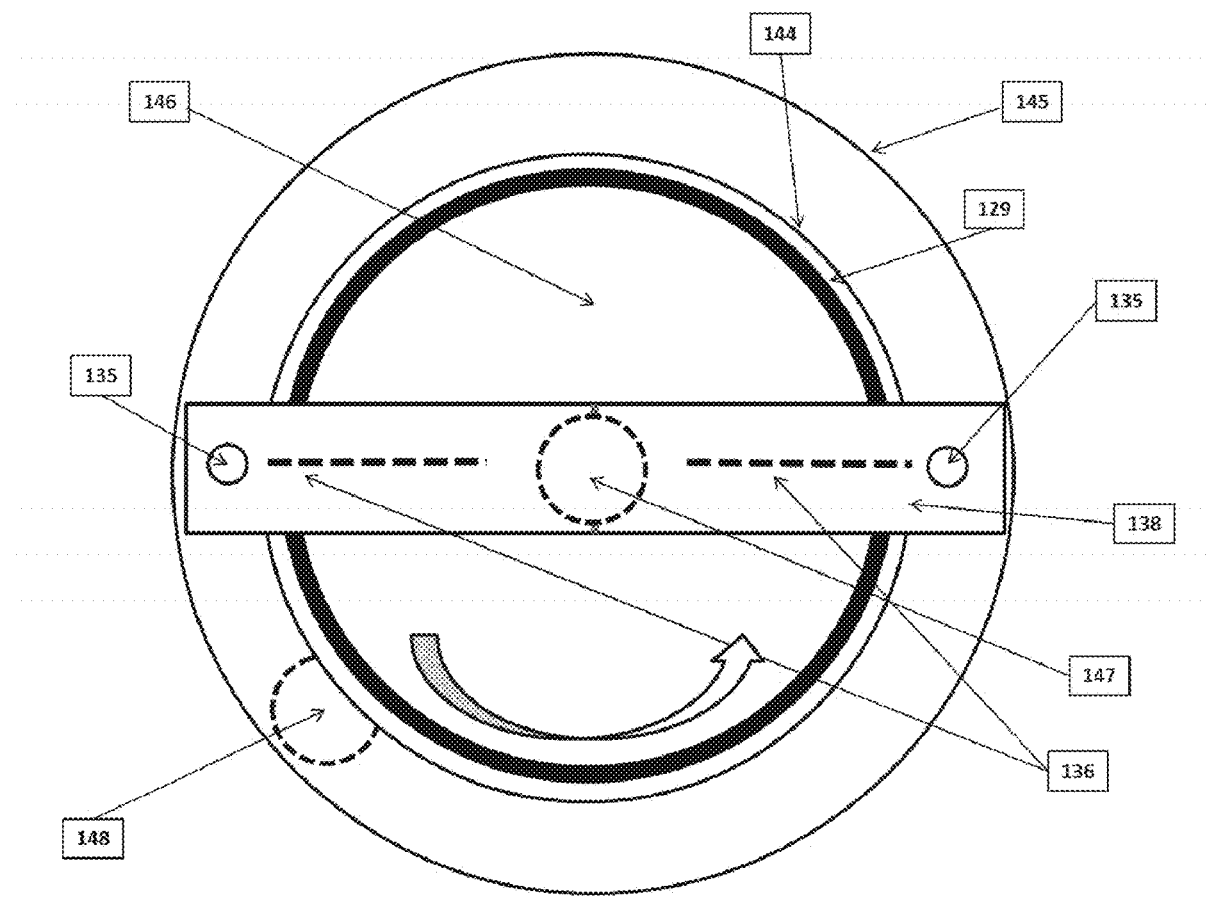
FIG. 11 shows a top view of an exemplary embodiment of an emulsification device (basic module)
Figure 12:
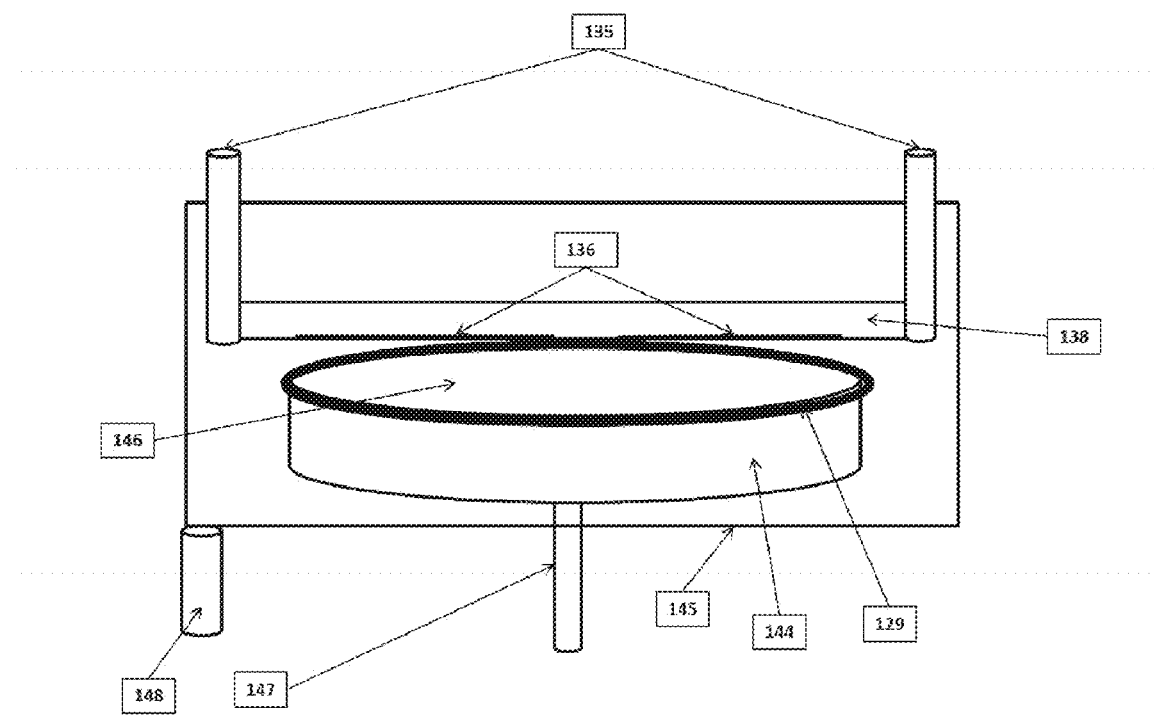
FIG. 12 shows a cross-section of the emulsification device in FIG. 11.
Figure 13:
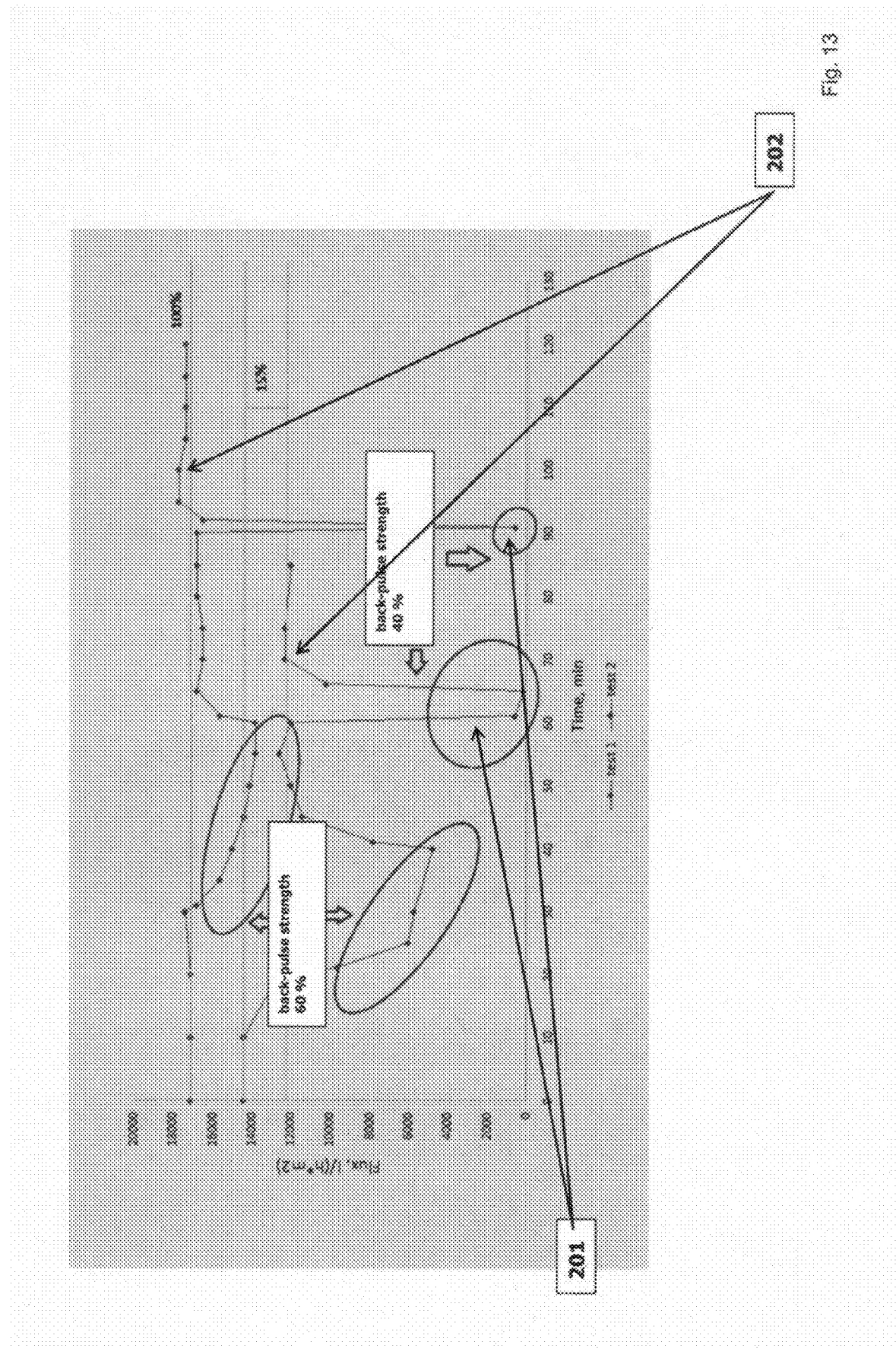
FIG. 13 shows a diagram illustrating the filtration flux over time of two different test liquids depending on the pumping capacity.

The invention claimed is:

1. A device for treatment of substances, comprising:
   at least one membrane medium comprising a first side configured to face an unfiltered phase of a substance and a second side configured to face a filtered phase of the substance; and
   a housing in which the at least one membrane medium is stationary or adapted to be rotated, the housing comprising:
   at least one feed inlet for the unfiltered phase of the substance,
   at least one overflow outlet for the unfiltered phase of the substance,
   at least one rotatable channel for drainage of the filtered phase of the substance, and
   a suction device configured to produce vacuum on regions of the at least one membrane medium on the side facing the unfiltered phase of the substance, the suction device comprising at least one suction slot arranged parallel to the at least one membrane medium at a distance of 0.1 mm to 0.5 mm from the membrane medium,
   wherein the at least one membrane medium is a plurality of membrane media each associated with a respective membrane support element and the suction device comprises a plurality of suction elements each associated with a respective membrane medium, and
   wherein the membrane support elements and the suction elements are alternately stacked on top of each other onto a sleeve shaft.

2. The device of claim 1, wherein the sleeve shaft is a rotatable sleeve shaft comprising one or more tappets, each of the one or more tappets engaging with the membrane support elements.

3. The device of claim 1, further comprising a tie rod to link the suction elements and the membrane support elements to the device.

4. A device for treatment of substances, comprising:
   at least one membrane medium comprising a first side configured to face an unfiltered phase of a substance and a second side configured to face a filtered phase of the substance; and
   a housing in which the at least one membrane medium is stationary or adapted to be rotated, the housing comprising:
   at least one feed inlet for the unfiltered phase of the substance,
   at least one overflow outlet for the unfiltered phase of the substance,
   at least one rotatable channel for drainage of the filtered phase of the substance, and
   a suction device configured to produce vacuum on regions of the at least one membrane medium on the side facing the unfiltered phase of the substance, the suction device comprising at least one suction slot arranged parallel to the at least one membrane medium at a distance of 0.1 mm to 20 mm from the membrane medium,
   wherein the at least one membrane medium is a plurality of membrane media each associated with a respective membrane support element and the suction device comprises a plurality of suction elements each associated with a respective membrane medium, and
   wherein the membrane support elements and the suction elements are alternately stacked on top of each other onto a sleeve shaft.

5. The device of claim 4, wherein the sleeve shaft is a rotatable sleeve shaft comprising one or more tappets, each of the one or more tappets engaging with the membrane support elements.

6. The device of claim 4, further comprising a tie rod to link the suction elements and the membrane support elements to the device.

* * * * *